United States Patent

Ohno

[11] Patent Number: 5,848,062
[45] Date of Patent: Dec. 8, 1998

[54] WIRELESS COMMUNICATION EQUIPMENT FOR REMOTE STATION

[75] Inventor: Katsumaru Ohno, Tokyo, Japan

[73] Assignee: NEC Corporation, Tokyo, Japan

[21] Appl. No.: 825,733

[22] Filed: Apr. 2, 1997

[30] Foreign Application Priority Data

Apr. 2, 1996 [JP] Japan ................................. 8-079981

[51] Int. Cl.⁶ .................................................. G08C 17/00
[52] U.S. Cl. ............................................ 370/311; 455/38.3
[58] Field of Search .................................... 370/311, 321, 370/336, 337, 465, 468, 442, 458; 455/115, 38.3

[56] References Cited

U.S. PATENT DOCUMENTS 5,517,679  5/1996  Yahagi ..................................... 455/38.5
5,561,693  10/1996  Yung et al. .............................. 375/377
5,570,369  10/1996  Jokinen .
5,682,417  10/1997  Nitta .......................................... 379/58

*Primary Examiner*—Ajit Patel
*Attorney, Agent, or Firm*—Young & Thompson

[57] ABSTRACT

Wireless TDMA communication equipment for a remote station which does not require inner temperature control circuit in order to control the temperature, comprising battery saving control circuit wherein the signal indicating whether or not a signal from a two-wire/four-wire converter exists and an output from a temperature sensor is received, when the signal to be transmitted to the wireless communication equipment does not exist, a time for intermittently operating the power source supplied to the wireless communication equipment is changed according to the output from the temperature sensor, and a temperature control portion having data rate control circuit wherein when the signal to be transmitted exists, the battery saving circuit is stopped, so that a coding rate of the wireless communication equipment and a transmission burst time are changed according to the temperature detecting circuit.

6 Claims, 3 Drawing Sheets

5,848,062

WIRELESS COMMUNICATION EQUIPMENT FOR REMOTE STATION

BACKGROUND OF THE INVENTION

The present invention relates to wireless communication equipment. More specifically, the present invention relates to the wireless communication equipment for a remote station having a function for controlling a temperature in the equipment.

DESCRIPTION OF THE RELATED ART

Heretofore, in the wireless communication system by a TDMA communication system shown in FIG. 1, an interactive telephone line and the like are transmitted between a base station 100 and many remote stations 200-1 to 200-n. In such a construction, in many cases, the remote stations are located in an area whose power source condition is not good. More specifically, in a desert area and a mountain area, a communication equipment must be operated by using a solar battery and the like. Due to such a condition, more specifically, the wireless communication equipment for the remote station using the TDMA communication system is provided with a battery saving function for intermittently controlling a power source supply in the equipment, more specifically, in a transmission/reception portion in order to reduce a consumed power during an idle time, not a state of a communication. Furthermore, in case of such communication equipment, in order to expand an operation temperature region, for example, a fan, a heater, etc. are used so that an inner temperature in the equipment may be controlled.

Here, a construction of an inner temperature control of a conventional wireless communication equipment for the remote stations 200-1 to 200-n will be explained by using a block diagram shown in FIG. 2.

Although various communication equipment elements of a wireless communication equipment 50 are incorporated in an inner portion of a small box, FIG. 2 shows only a portion relating to the temperature control in the equipment which is directly related to the present invention. That is, the inner temperature in the equipment is detected by temperature detecting means 21, and the detected result is transmitted to inner temperature control means 22. According to the detected result, the inner temperature control means 22 operates the fan, etc. in such a manner that the inner temperature in the equipment is lowered when the inner temperature in the equipment is high. When the inner temperature in the equipment is low, the inner temperature control means 22 operates the heater, etc. in such a manner that the inner temperature in the equipment is raised. On one hand, power source supply portion control means 23 transmits a battery saving signal for a predetermined intermittent time to power source supply means 24. The power source supply means 24 is controlled in such a manner that the power source supplied to the inner portion of the equipment is limited by the battery saving signal from the power source supply portion control means 23. The consumed power in the equipment is controlled. For example, as shown in FIG. 3, according to the battery saving signal, a power source voltage is operated so that the power source of the power source supply means 24 may be turned on at an interval $T_{on}$ and it may be turned off at an interval $T_{OFF}$. When the communication equipment is not in a state of transmission or reception, such a battery saving operation is continued in order to reduce the consumed power. Furthermore, when the communication equipment is in a state of transmission or reception, the battery saving operation is stopped, so that a normal power source is supplied to the communication equipment.

In a conventional technique as explained above, in order to control the inner temperature in the equipment, the inner temperature control means such as the fan, etc. must be additionally installed. Accordingly, the number of components of the equipment is increased, whereby there is such a problem that the equipment becomes larger.

SUMMARY OF THE INVENTION

It is an object of the present invention to provide a wireless communication equipment for a remote station which does not need the inner temperature control means, comprises a simple construction and has a reliable temperature control system.

According to one aspect of the present invention, there is provided a wireless communication equipment for a remote station transmitting a signal between the remote station and a base station by using a TDMA communication system comprising temperature detecting means for detecting an inner temperature in the wireless communication equipment, first control means for changing a periodical time which intermittently operates a power source supplied to the wireless communication equipment according to the temperature detecting means when the wireless communication equipment is in an idle state, and second control means for changing a coding rate of the wireless communication equipment and a transmission burst time for the TDMA communication according to the temperature detecting means when the wireless communication equipment has a signal to be transmitted.

According to another aspect of the present invention, there is provided a wireless communication equipment for a remote station transmitting a signal between the remote station and a base station by using a TDMA communication system comprising conversion means for converting an input/output signal into a predetermined form, coding/decoding means connected to the conversion means, for receiving a temperature control signal, for coding the received temperature control signal into a digital data having a predetermined coding rate, and for decoding an output signal from a predetermined digital data, transmission/reception means connected to the coding/decoding means, for receiving the temperature control signal, for transmitting a predetermined TDMA burst signal as a transmitted signal, and for outputting a demodulated data of a received wireless signal to the coding/decoding means, temperature detecting means for detecting the temperature in the wireless communication equipment, switch means for intermittently operating the power source supplied to the conversion means, the coding/decoding means and the transmission/reception means by receiving a battery saving signal, battery saving control means for receiving the output from the temperature detecting means, and for changing the synchronization which intermittently operates the power source supplied to the wireless communication equipment according to the output from the temperature detecting means when the wireless communication equipment is in the idle state, and data rate control means for stopping the battery saving control means when the wireless communication equipment has the signal to be transmitted, and for changing the coding rate of the coding/decoding means and the transmission burst time for the TDMA communication according to the temperature detecting means.

DETAILED DESCRIPTION OF THE PREFERRED EMBODIMENTS

The present invention will be explained by using the accompanying drawings.

Figure 1:
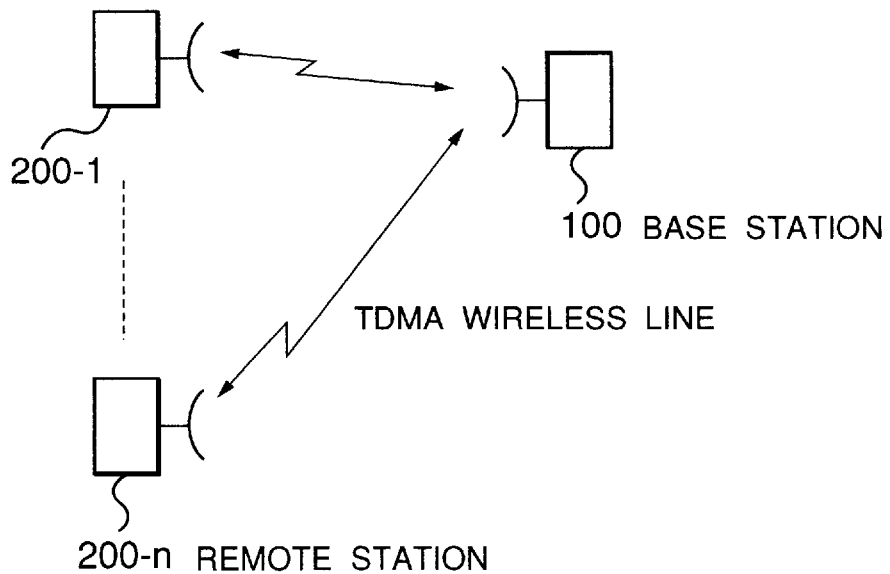
FIG. 1 shows a network construction of a conventional wireless communication system using a TDMA communication system comprising a plurality of remote stations and a base station.
Figure 2:
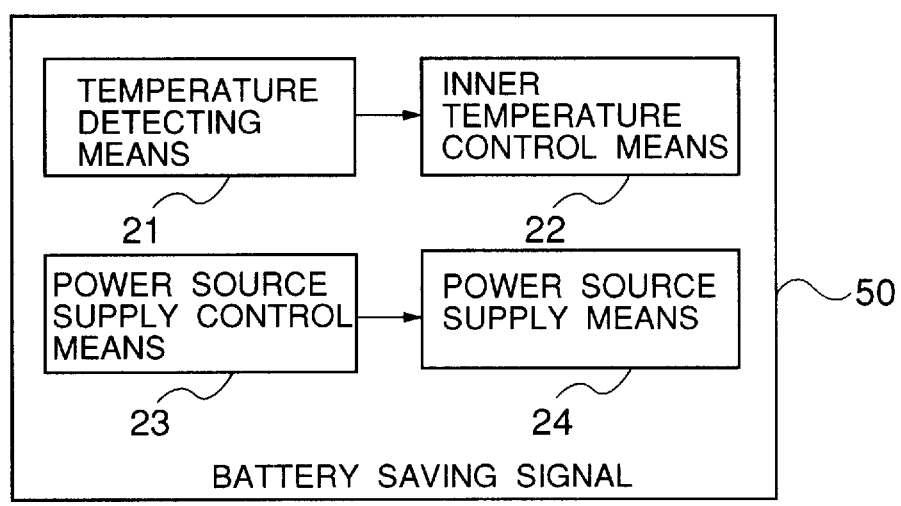
FIG. 2 shows a construction of an inner temperature control of the wireless communication equipment of remote stations 200-1 to 200-n shown in FIG. 1.
Figure 3:
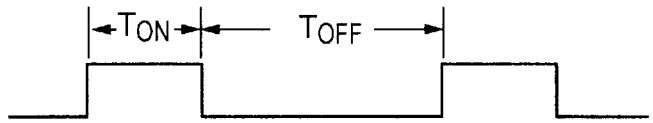
FIG. 3 shows a battery saving operation in FIG. 2.
Figure 4:
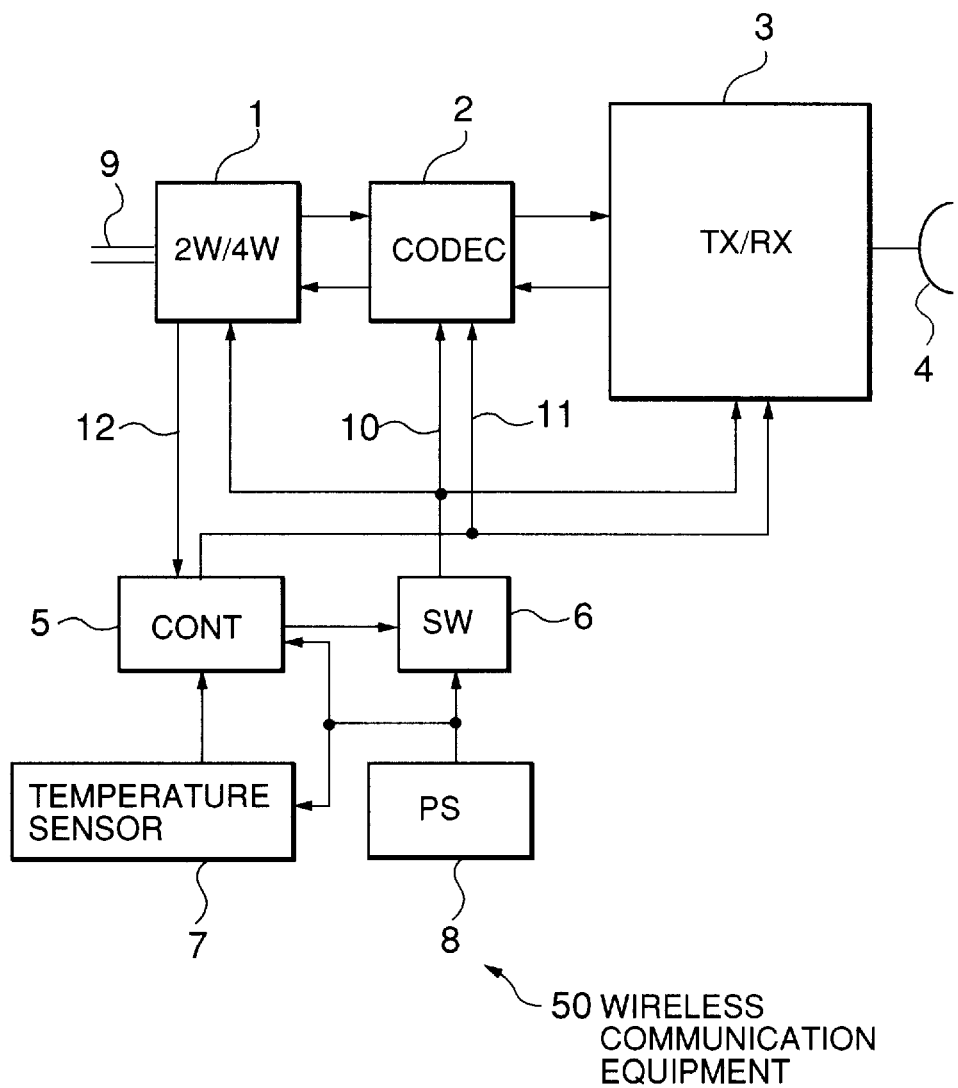
FIG. 4 is a block diagram of the wireless communication equipment of the remote station according to the present invention.

FIG. 4 is a block diagram of a wireless communication equipment 50 of a remote station showing an embodiment according to the present invention.

The wireless communication equipment 50 shown in FIG. 4 is accommodated in a box, similarly to a conventional technique. For a simple explanation, FIG. 4 shows a construction of the wireless communication equipment of the remote station when one-channel telephone line is transmitted/received between a master station (not shown) and a wireless line by a TDMA communication system. The wireless communication equipment 50 is characterized in that inner temperature control means such as a fan and the like which are conventionally used is not necessary. Here, a numeral 9 denotes a two-wire line for transmitting a telephone line. A sound signal and the like are connected to a two-wire/four-wire converter 1 via the two-wire line 9. The two-wire/four-wire converter 1 has a function to convert a two-wire type signal into a four-wire type signal.

An input/output signal from the two-wire/four-wire converter 1 is analog/digital converted by a CODEC 2. The CODEC 2 has a function to receive a temperature control signal 11 and to vary a coding rate.

That is, for example, a maximum coding rate of the CODEC 2 is set to 64 kbps. Various band-compressed coding rates 32 kbps, 16 kbps and 4.8 kbps are controlled by the temperature control signal 11.

The CODEC 2 may be an LSI which can select the coding rate in an inner portion in order to correspond to various coding rates. Furthermore, such a method that a plurality of CODECs having respective different coding rates are switched may be used.

Next, after a transmission portion of a transmission/reception portion 3 receives a transmitted data digitized by the CODEC 2 and the transmitted data is modulated into a predetermined digital data, the modulated data is transmitted as a TDMA transmission burst signal from an antenna 4. Furthermore, a reception portion receives the TDMA signal received from the antenna 4, and an obtained received data demodulated by a digital demodulator is outputted to the CODEC 2.

Next, a main power source 8 for the communication equipment supplies a power source supply to the two-wire/four-wire converter 1, the CODEC 2 and the transmission/reception portion 3, respectively via a power source switch 6 installed for turning on/off at a predetermined period by a power source line 10. Since the power source switch can carry out a switching at high speed, a power MOSFET switch is usually used.

Furthermore, a temperature control portion 5 inputs a temperature sensor obtained by a temperature sensor 7 for sensing the temperature in the box which accommodates the communication equipment. The two-wire/four-wire converter 1 detects an on-hook signal or an off-hook signal of the telephone line detecting whether or not the signal to be transmitted to the two-wire line 9 exists. Therefore, the signal is inputted to the temperature control portion 5 as a transmission detecting signal 12.

The temperature control portion 5 receives the transmission detecting signal 12. When the temperature control portion 5 judges that the communication equipment is not in a communication state, that is, it is in an idle state, a battery saving control for turning on/off the power source switch 6 is carried out.

This battery saving operation is carried out in the following manner.

The temperature control portion 5 which inputs the temperature data detected by the temperature sensor 7 compares the temperature to a predetermined set temperature. According to the compared result, the synchronization for turning on/off the power source switch 6 is changed, whereby a time period for the battery saving is controlled.

Figure 5:
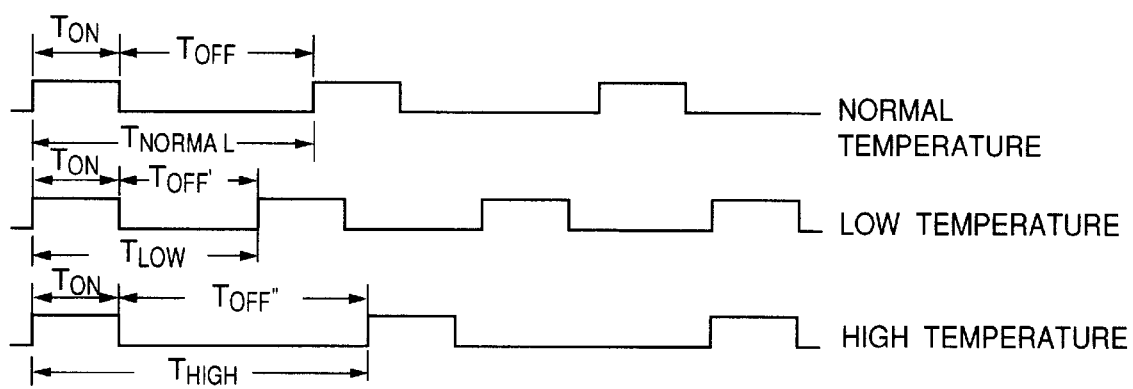
FIG. 5 shows the battery saving operation according to a control of a temperature control portion 5 shown in FIG. 4 when a communication state is idle.

That is, as shown in FIG. 5, when the temperature in the box is a desired set temperature, the period for the battery saving is controlled in such a manner that a time for turning on the power source ($T_{ON}$) and a time for turning off the power source ($T_{OFF}$) are repeated at a predetermined period ($T_{NORMAL}$). When the temperature data is reduced to less than the set temperature, the time for turning off the power source is set to $T_{OFF}'$ which is shorter than $T_{OFF}$, and the period is changed to a period $T_{LOW}$.

Furthermore, when the temperature data is raised up to more than the set temperature, the time for turning off the power source is set to $T_{OFF}'''$ which is longer than $T_{OFF}$, and the period is changed to a period $T_{HIGH}$.

According to the present invention, the control of the temperature in the box by controlling a battery saving period will be explained below.

In FIG. 5, in case of $T_{ON}$, a heat dissipation quantity is defined as $Q_{ON}$. In case of $T_{OFF}$, the heat dissipation quantity is defined as $Q_{OFF}$. The following relationship is obtained:

$$Q_{ON} > Q_{OFF} \tag{1}$$

The reason for obtaining the above inequality (1) is as follows. That is, in case of $T_{OFF}$, a load is applied to the PS 8 from three circuits, that is, the CONT 5, the SW 6 and the temperature sensor 7. On one hand, in case of $T_{ON}$, in addition to the three circuits, the 2W/4W 1, the CODEC 2 and the TX/RX 3 are added to the load. Here, an average heat dissipation quantity $Q_{AVG}$ is defined as the following equation.

$$Q_{AVG} = (Q_{ON} \cdot T_{ON} + Q_{OFF} \cdot T_{OFF}) / (T_{ON} + T_{OFF}) \tag{2}$$

That is, the average heat dissipation quantity and the temperature $T_o$ in the box can be approximate to each other by the following equation.

$$Q_{AVG} \approx h \cdot S \cdot \Delta T \tag{3}$$

$$\Delta T = T_o - T_\infty \tag{4}$$

$T_\infty$: an outside-air temperature (an air temperature at a point sufficiently separated from the box)

S: a surface area of the box h: a heat transfer coefficient in the box

In the equation (3), since S and h are constants, ΔT is proportional to $Q_{AVG}$.

Accordingly, in the equation (4), $T_o$ is proportional to $Q_{AVG}$. In other words, the more the average heat dissipation quantity in the box is increased, the higher the temperature in the box is raised. While, the less the average heat dissipation quantity in the box is reduced, the lower the temperature in the box is fallen down.

Furthermore, as shown in the equation (2), the average heat dissipation quantity in the box is determined by a ratio of $T_{ON}$ and $T_{OFF}$. Accordingly, from a condition of the inequality (1), when $T_{OFF}$ is lengthened, the average heat dissipation quantity in the box is reduced. When $T_{OFF}$ is shortened, the average heat dissipation quantity in the box is increased.

Accordingly, when the battery saving period is shortened, the temperature in the box is raised. When the battery saving period is lengthened, the temperature in the box is lowered.

In such a manner, the battery saving period is changed, whereby the temperature in the box can be controlled so that it may be set to the set temperature without the fan and the like.

As a result, the heat dissipation quantity of each communication equipment in the box is controlled, and a predetermined set temperature can be obtained.

Such a case that the equipment is not in the communication state, that is, it is in the idle state is explained above. When the equipment is in the communication state, the battery saving operation is stopped, and it is necessary to normally operate the equipment. As a result, the heat dissipation quantity of the equipment is increased, and the temperature in the box exceeds a maximum tolerance of each communication equipment, whereby a reliability of an overall equipment is lowered. In the worst case, there such a fear that the equipment suffers from a fault.

Therefore, the communication equipment 50 according to the present invention inputs the transmission detecting signal 12 indicating the communication state to the temperature control portion 5. The temperature control portion 5 outputs the temperature control signal 11 for controlling the CODEC 2 and the transmission/reception portion 3.

That is, when the temperature sensor 7 senses that the temperature in the box is higher than the set temperature, the temperature control portion 5 changes a transmission rate of the CODEC 2 in such a manner that a standard coding/decoding processing of 64 kbps is changed into, for example, a band-compressed coding/decoding processing of 32 kbps. The transmission rate is lowered. When the transmission rate is changed, a data information as to a current transmission rate is inserted into a top portion of a burst data of the transmission data from the remote station. The inserted data information is transmitted to the base station. According to the data information as to the transmission rate, the base station changes a data rate of the transmission/reception portion thereof, whereby it is possible to communicate between the base station and the remote station.

Furthermore, simultaneously, the temperature control signal 11 is inputted to the transmission/reception portion 3, and the temperature is controlled.

That is, when the data is transmitted at the rate of 32 kbps, a data portion time of a TDMA burst data is reduced to ½, compared to the transmission rate of 64 kbps.

As a result, the power consumed by a transmitted power amplifying portion in the transmission/reception portion 3 is maximum. Furthermore, in the whole equipment, the maximum consumed power is generated in the transmitted power amplifying portion.

Therefore, when a transmission burst time of the transmitted power amplifying portion is reduced to ½, there is such an effect that the consumed power is reduced to about ¼.

Accordingly, the temperature control portion 5 compares the set temperature to the temperature in the box. In order that the temperature in the box may be changed to the set temperature, the transmission rate of the CODEC is controlled in such a manner that the transmission rate may be changed, so that the temperature can be controlled.

When the standard coding rate, that is, 64 kbps is lowered, although a sound quality is slightly deteriorated, this deterioration is within a range of the tolerance.

Furthermore, according to the embodiment of the present invention, although such a construction that one-channel sound data is wireless-transmitted is explained, the present invention is nor limited to the embodiment.

That is, in order to transmit a plurality sound channels, when a plurality of two-wire/four-wire converters and CODECs exist, for example, if all the channels are not in the communication state, the battery saving operation which can vary the battery saving period all over the equipment is carried out, so that the temperature may be controlled.

When at least one channel is in the communication state, the battery saving operation is stopped relative to the communication-state channel. Simultaneously, the battery saving operation of the transmission/reception portion being a common portion is stopped.

On one hand, the coding rate of the CODEC and the transmission burst time of the transmission/reception portion are controlled, whereby the temperature may be controlled.

As explained above, according to the wireless communication equipment of the present invention, when the equipment is not the communication state, the battery saving period is controlled. When the equipment is in the communication state, the coding rate of a sound CODEC and the transmitted data burst time of the transmitted power amplifying portion are controlled, so that there is such an effect that it is possible to provide the wireless communication equipment comprising only a simple construction which can control the temperature and have a high reliability.

What is claimed is:

1. A wireless communication equipment for a remote station transmitting a signal between the remote station and a base station by using a TDMA communication system comprising:

temperature detecting means for detecting an inner temperature in said wireless communication equipment;

first control means for changing a periodical time in which intermittently a power source operates, said power source supplies said wireless communication equipment, said periodical time is changed in response to the output of said temperature detecting means when said wireless communication equipment is in an idle state; and second control means for changing a coding rate of said wireless communication equipment and a transmission burst time for said TDMA communication in response to the output of said temperature detecting means when said wireless communication equipment has a signal to be transmitted.

2. A wireless communication equipment for a remote station transmitting a signal between the remote stations and a base station by using a TDMA communication system comprising:

conversion means for converting an input/output signal into a predetermined form;

coding/decoding means connected to said conversion means, for receiving a temperature control signal, for coding the received temperature control signal into a digital data having a predetermined coding rate, and for decoding an output signal from a predetermined digital data;

transmission/reception means connected to said coding/decoding means, for receiving said temperature control signal, for transmitting a predetermined TDMA burst signal as a transmitted signal, and for outputting a demodulated data of a received wireless signal to said coding/decoding means;

temperature detecting means for detecting the temperature in said wireless communication equipment;

switch means for intermittently operating the power source supplied to said conversion means, said coding/decoding means and said transmission/reception means by receiving a battery saving signal;

battery saving control means for receiving the output from said temperature detecting means, and for changing the periodical time which intermittently operates the power source supplied to said wireless communication equipment according to the output from said temperature detecting means when said wireless communication equipment is in the idle state; and data rate control means for stopping said battery saving control means when said wireless communication equipment has the signal to be transmitted, and for changing the coding rate of said coding/decoding means and said transmission burst time for said TDMA communication in response to the output of said temperature detecting means.

3. The wireless communication equipment according to claim 1, wherein said first control means comprising the steps:

repeating an intermittent operation for turning on/off said power source for a constant time at a predetermined period when the temperature obtained by said temperature detecting means is a predetermined temperature;

lengthening a time for turning off said power source when it is detected that the temperature obtained by said temperature detecting means is higher than the predetermined temperature, and for making a period for turning on/off said power source longer than said predetermined period; and shortening the time for turning off said power source when it is detected that the temperature obtained by said temperature detecting means is lower than the predetermined temperature, and for making the period for turning on/off said power source shorter than said predetermined period.

4. The wireless communication equipment according to claim 2, wherein said battery saving control means comprising the steps:

intermittently operating said power source when the temperature obtained by said temperature detecting means is the predetermined temperature, whereby the battery saving is carried out at a predetermined period;

lengthening the time for turning off said power source when the temperature obtained by said temperature detecting means is higher than the predetermined temperature, whereby said period is lengthened; and shortening the time for turning off said power source when the temperature obtained by said temperature detecting means is lower than the predetermined temperature, whereby said period is shortened.

5. The wireless communication equipment according to claim 1, wherein said second control means comprising the steps:

coding a coding rate of an inputted signal to said wireless equipment into a data having a predetermined rate when the temperature obtained by said temperature detecting means is the predetermined temperature;

switching said coding rate into the data having a lower rate than said predetermined rate and coding the switched data when it is detected that the temperature obtained by said temperature detecting means is higher than the predetermined temperature; and switching said coding rate into the data having a higher rate than said predetermined rate and coding the switched data when it is detected that the temperature obtained by said temperature detecting means is lower than the predetermined temperature.

6. The wireless communication equipment according to claim 2, wherein said data rate control means comprising the steps:

reducing the coding rate of said coding/decoding means when the temperature obtained by said temperature detecting means is higher than the predetermined temperature;

increasing the coding rate of said coding/decoding means when the temperature obtained by said temperature detecting means is lower than the predetermined temperature; and controlling a TDMA data burst time of said transmission/reception means by matching to said coding rate.

* * * * *